United States Patent
Balasubramanian et al.

(10) Patent No.: US 10,061,598 B2
(45) Date of Patent: Aug. 28, 2018

(54) GENERATION OF USAGE TIPS

(71) Applicant: International Business Machines Corporation, Armonk, NY (US)

(72) Inventors: Swaminathan Balasubramanian, Southfield, MI (US); Ravi P. Bansal, Tampa, FL (US); Rajib Bhattacharya, Kolkata (IN); Sandip D. Mahajan, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 14/595,677

(22) Filed: Jan. 13, 2015

(65) Prior Publication Data
US 2016/0203003 A1 Jul. 14, 2016

(51) Int. Cl.
| G06F 9/451 | (2018.01) |
| G06F 3/0489 | (2013.01) |
| G06F 9/44 | (2018.01) |
| G06F 3/14 | (2006.01) |
| G06F 17/30 | (2006.01) |

(52) U.S. Cl.
CPC ........ *G06F 9/4446* (2013.01); *G06F 3/04892* (2013.01); *G06F 3/14* (2013.01); *G06F 9/453* (2018.02); *G06F 17/30528* (2013.01); *G06F 17/30554* (2013.01)

(58) Field of Classification Search
CPC ...... G06F 3/04895; G06F 9/4446; G06F 3/14; G06F 17/30528; G06F 17/30554; G06F 9/453
See application file for complete search history.

(56) References Cited

U.S. PATENT DOCUMENTS

| 7,814,473 B2 | 10/2010 | Datta et al. | |
| 7,979,798 B2 | 7/2011 | Wadhwa | |
| 2005/0283736 A1* | 12/2005 | Elie | G06Q 10/10 715/771 |
| 2006/0053372 A1* | 3/2006 | Adkins | G09B 7/02 715/709 |
| 2009/0138292 A1 | 5/2009 | Dusi et al. | |
| 2009/0150779 A1* | 6/2009 | Kodama | G06F 9/4446 715/708 |
| 2009/0199097 A1* | 8/2009 | Black | G06F 9/4446 715/708 |
| 2012/0115122 A1* | 5/2012 | Bruce | G09B 7/00 434/323 |

(Continued)

OTHER PUBLICATIONS

Zheleva et al., "Preserving the Privacy of Sensitive Relationships in Graph Data", Security, and Trust in KDD-First ACM SIGKDD International Workshop, PinKDD 2007, Revised Selected Papers; Springer Verlag, 20 pages.

(Continued)

*Primary Examiner* — Aaron Lowenberger
(74) *Attorney, Agent, or Firm* — Samuel A. Waldbaum

(57) ABSTRACT

One or more processors monitor usage of an application on a first computing device. The one or more processors determine whether the usage of a feature of the application on the first computing device was successful. Responsive to determining that the usage of the feature of the application on the first computing device was not successful, the one or more processors create a usage tip associated with the feature of the application.

17 Claims, 2 Drawing Sheets

(56) References Cited

U.S. PATENT DOCUMENTS

| | | | |
|---|---|---|---|
| 2013/0074051 A1 | 3/2013 | Freeman | |
| 2013/0080251 A1 | 3/2013 | Dempski | |
| 2013/0275267 A1 | 10/2013 | Cvek | |
| 2014/0245184 A1 | 8/2014 | Cheng et al. | |
| 2014/0282098 A1 | 9/2014 | McConnell | |
| 2015/0172262 A1* | 6/2015 | Ortiz, Jr. | H04W 12/04 726/4 |
| 2015/0242504 A1* | 8/2015 | Profitt | G06F 3/04842 707/767 |
| 2015/0286487 A1 | 10/2015 | Glass | |
| 2016/0077674 A1 | 3/2016 | Forster et al. | |

OTHER PUBLICATIONS

Aron, "Information Privacy for Linked Data", Massachusetts Institute of Technology, Dec. 28, 2012, 79 pages.

IBM: List of IBM Patents or Patent Applications Treated as Related (Appendix P), Mar. 7, 2016, pp. 1-2.

Pending U.S. Appl. No. 15/057,267, filed Mar. 1, 2016, entitled: "Generation of Usage Tips", pp. 1-24.

* cited by examiner

GENERATION OF USAGE TIPS

TECHNICAL FIELD

The present invention relates generally to usage tips, and more particularly to generating usage tips for a relevant feature or features of an application.

BACKGROUND

Learning software applications, such as a word processor or a web browser has become part and parcel of our everyday lives. Indeed, just to obtain entry level employment for a company, one must be at least proficient with several software applications. This can sometimes be a daunting task and that is why some applications have a help menu that provides tips and suggestions regarding how to correctly utilize the features of the relevant software application.

SUMMARY

The present invention provides a method, system, and computer program product for creating a usage tip. One or more processors monitor usage of an application on a first computing device. The one or more processors determine whether the usage of a feature of the application on the first computing device was successful. Responsive to determining that the usage of the feature of the application on the first computing device was not successful, the one or more processors create a usage tip associated with the feature of the application.

DETAILED DESCRIPTION

Embodiments of the present invention will now be described in detail with reference to the accompanying Figures.

Figure 1:
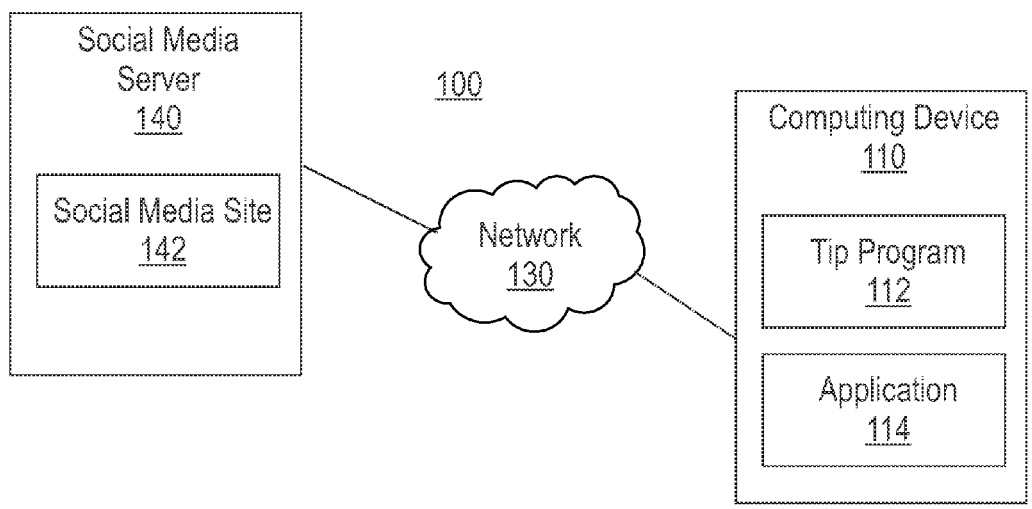
FIG. 1 illustrates a usage tip creation system, in accordance with an embodiment of the invention.

FIG. 1 illustrates usage tip creation system 100, in accordance with an embodiment of the invention. In an exemplary embodiment, usage tip creation system 100 includes computing device 110 and social media server 140 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between computing device 110 and social media server 140.

Social media server 140 includes social media site 142. Social media server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, social media server 140 can comprise a cluster of web servers executing the same software to collectively process the requests for the web pages as distributed by a front end server and a load balancer. In the example embodiment, social media server 140 is a computing device that is optimized for the support of websites which reside on social media server 140, such as social media site 142, and for the support of network requests related to websites, which reside on social media server 140. Social media server 140 is described in more detail with reference to FIG. 3.

Social media site 142 is a collection of files including, for example, HTML files, CSS files, image files and JavaScript files. Social media site 142 can also include other resources such as audio files and video files.

Computing device 110 includes tip program 112 and application 114. Computing device 110 may be a desktop computer, a notebook, a laptop computer, a tablet computer, a handheld device, a smart-phone, a thin client, or any other electronic device or computing system capable of receiving and sending data to and from other computing devices, such as social media server 140, via network 130. Although not shown, optionally, computing device 110 can comprise a cluster of web devices executing the same software to collectively process requests. Computing device 110 is described in more detail with reference to FIG. 3.

Application 114 is a software application such as a word processor, web browser or other application.

Tip program 112 is capable of monitoring the usage of application 114 and determining whether or not a feature of application 114 is being utilized successfully. Tip program 112 is also capable of generating one or more usage tips based on determining whether or not a feature of application 114 is being utilized successfully. In addition, tip program 112 is software capable of receiving information, such as social media messages and profile information from social media server 140 via network 130, and generating one or more usage tips based on the received information. In the example embodiment, tip program 114 is partially integrated with application 114, however, in other embodiments, tip program 114 may be fully integrated or completely separate from application 114. The operations and functions of tip program 112 is described in more detail with reference to FIG. 2.

Figure 2:
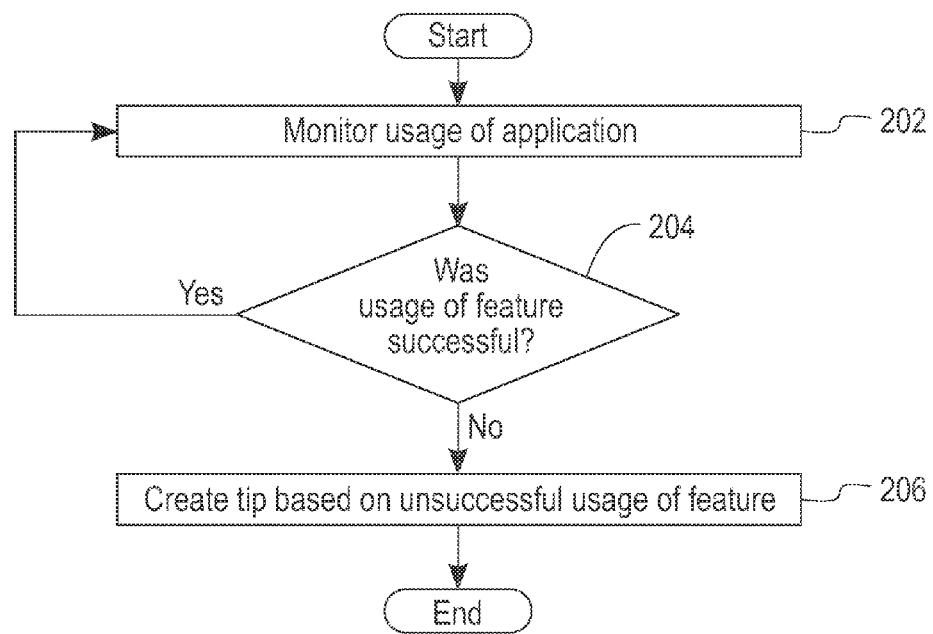
FIG. 2 is a flowchart illustrating the operations of the tip program of FIG. 1 in generating a usage tip based on determining whether or not a feature was used successfully, in accordance with an embodiment of the invention.

FIG. 2 is a flowchart illustrating the operations of tip program 112 in determining whether or not a feature of an application is being utilized successfully and generating a usage tip based on the determination, in accordance with an exemplary embodiment of the invention. In the example embodiment, tip program 112 monitors the usage of application 114 by the user of computing device 110 (step 202). The data collected by tip program 112 while monitoring may include, but is not limited to: features used, user preferences associated with features, data regarding the hardware environment (including CPU, memory, network, etc.), location information (such as location of the user), and time of day. For example, if application 114 is a word processor, tip program 112 monitors the usage of application 114 by the user of computing device 110, including the usage of specific features of the word processor, such as the graph feature (create a graph), and general usage of the word processor, such as utilizing the word processor to type a letter. In the example embodiment, along with monitoring, tip program 112 also collects and stores the usage data in memory. In the example embodiment, the usage data may be stored in correlation with a specific user or user profile. In other embodiments, specific features to be monitored may be designated by a software/product developer. In further embodiments, tip program 112 may access a repository that stores the most frequently used features of application 114 and only monitor the most frequently used features. The most frequently used features may be specific to the user of computing device 110, based on monitoring previously done by tip program 112. Alternatively, the most frequently used features may be generalized and based on the most frequently used features of application 114 by the public at large.

In the example embodiment, tip program 112 determines if the usage of a feature was successful (decision 204). In the example embodiment, tip program 112 detects when a feature is utilized. For example, if a print feature within a word processor is utilized, tip program 112 detects that the print feature has been utilized by the user of computing device 110 and determines whether the usage of the feature was successful. In this example, tip program 112 determines whether the print was successful by communicating with the printer via network 130, such as by receiving and examining a response code sent by the printer. Based on examination of the response code, tip program 112 can determine whether the print was successful. In addition, if application 114 is software used to update a website, tip program 112 may examine the response code received via communication with the website in order to determine whether the update was successful. Another example may be if tip program 112 detects that a pdf (portable document format) feature, such as pdf converter, within application 114 being utilized. If two actions are required by the user of computing device 110 in order to convert a document into pdf format, but the user forgets the $2^{nd}$ action, the document may not be converted. In this example, after tip program 112 detects that the pdf feature is being utilized, tip program 112 monitors the usage of the feature in order to determine whether the usage of the feature was successful (i.e., whether a pdf document was created). In other embodiments, rather than an automatic determination, for example by way of communicating with a device or monitoring usage of application 114, tip program 112 may prompt the user of computing device 110 to determine whether the usage of the feature was successful. For example, after detecting the usage of a feature, such as a print feature, tip program 112 may prompt the user of computing device 110 to provide input as to whether the usage of the feature was successful (i.e., whether the print was successful). In further embodiments, tip program 112 may monitor how many times that the user of computing device 110 has attempted to utilize a feature and determine whether the usage of the feature was successful based on the monitoring. In this further embodiment, tip program 112 may monitor the number of times the feature has been utilized in a certain period of time. For example, if tip program 112 detects that the user of computing device 110 has utilized the pdf feature five times with relation to the same document within a five minute span, tip program 112 may determine that the usage of the feature was unsuccessful. In even further embodiments, tip program 112 may monitor the usage of a feature, including the steps taken by the user, and compare the steps taken to information contained within a reference file in order to determine whether the usage of the feature of application 114 was successful. In this embodiment, the reference file contains information that details one or more features and the corresponding steps that should be executed in order to use the feature correctly. The reference file may be created by a developer or may be compiled via crowd sourcing. In one embodiment, while tip program 112 monitors the usage of the application (step 202), tip program 112 may also store iterations when a feature has been utilized successfully and the corresponding steps involved. This may be later referenced by tip program 112 when determining whether a feature is being utilized correctly.

If tip program 112 determines that the usage of the feature of application 114 was successful (decision 204, "YES" branch), tip program 112 continues to monitor the usage of application 114 (step 202).

If tip program 112 determines that the usage of the feature of application 114 was unsuccessful (decision 204, "NO" branch), tip program 112 creates a usage tip based on the unsuccessful usage of the feature (step 206). Referring to the example above, if tip program 112 determines, by way of communication with another device or program, that the usage of a feature, such as the pdf feature, was unsuccessful due to the user of computing device 110 failing to complete a $2^{nd}$ action, tip program 112 creates a usage tip prompting the user to perform the $2^{nd}$ action in order to successfully utilize the pdf feature. In one embodiment, tip program 112 may reference an electronic usage guide or reference database to determine the steps needed in order to successfully utilize the feature. Tip program 112 then monitors the usage of the application to determine whether the feature was utilized successfully, in the manner described above. If tip program 112 determines the usage of the feature was unsuccessful, tip program 112 may cross-reference the steps taken by the user of computing device 110 with the steps recited in the reference guide or database in order to determine the information that should be contained within the usage tip.

In one embodiment, tip program 112 may be located on a central server with application 114 being located on computing device 110.

In a second embodiment, tip program 112 may communicate with social media site 142, or a professional network website (or employer website) via network 130 in order to determine the profession of the user of computing device 110, and therefore, determine which features of application 114 are most likely to be utilized by the user of computing device 110. For example, if tip program 112 determines that the user of computing device 110 is a graphic designer, then tip program 112 may create (and present) usage tips to the user of computing device 110 related to graphic design. In addition, tip program 112 may retrieve information related to social interests, scholastic interests, or any other type of profile information in determining usage tips to create. In other embodiments, tip program 112 may prompt the user of computing device 110 to answer certain questions in order to determine information regarding the user's vocation, interests, social activities and other user information, and utilize the information in determining usage tips to create. Furthermore, tip program 112 may access tag repositories and obtain all tags associated with the user (such as tags associated with the user's profile on an employer website), access bookmark repositories and obtain all bookmarks associated with the user, access a corporate database and obtain information about the user's skill set and role within the company, and obtain information from any other social networks or communities that the user may be associated with. Tip program 112 may utilize this information to determine which features of application 114 are most likely to be utilized by the user of computing device 110. For example, tip program 112 may access a tag repository associated with an employer website of the user and retrieve tags such as: "mvc" (model-view-controller), "soa" (services-oriented architecture), and "uml" (unified modeling language). Tip program 112 may then cross-reference the retrieved tags with a tag database containing a list of tags and corresponding professions/fields, and determine that the user is a software architect. Based on this determination, tip program 112 presents usage tips associated with the profession or field of art. In this embodiment, tip program 112 may utilize a database containing usage tips and corresponding professions, fields of art. In one embodiment, tip program 112 may only create and present usage tips related to the most recently added or most popular information (such as most recently added tag).

In a third embodiment, tip program 112 may provide usage tips for a feature being utilized on a second device. For example, if the user of computing device 110 typically utilizes a specific feature of application 114 on computing device 110, if tip program 112 detects that the user is now using a second device (also containing the same application), tip program 112 may provide the user with a usage tip concerning the specific feature with regard to the second device. This may be helpful because, in some cases, the steps needed to successfully utilize a feature may vary based on the type of device (i.e., CPU vs. tablet). In the third embodiment, tip program 112 monitors the usage of a feature or features on the first device of the user (i.e., computing device 110), in the same manner as described above. In this third embodiment, tip program 112 may record the features utilized by the user and the corresponding feature tips presented to the user. In other embodiments, tip program 112 may store features (and corresponding usage steps) determined to be relevant to the user or feature, by any of the ways described, and/or the most frequently utilized features (and corresponding usage steps) by the user or public at large, in association with the login information of the user. Tip program 112 then detects that the user has begun using a second device via network 130, by way of detecting that the user has logged into a second device (input login information) connected to network 130. This can be accomplished, for example, by way of communication between tip program 112 and the second device via network 130. In other embodiments, tip program 112 may receive input detailing that the second device is a user device and should be monitored, or in even further embodiments, tip program 112 may monitor all devices connected to a specific network, such as a personal home network. Tip program 112 then monitors the usage of features on the second device and presents relevant usage tips for the second device. For example, if the user of computing device 110 utilizes a feature of application 114 on computing device 110, tip program 112 may record the features and usage of the features. If tip program 112 then detects, via a network, that the user has moved to a second device (which also contains the same application), tip program 112 may then monitor the usage of the application on the second device. If tip program 112 detects that the recorded feature is being attempted to be utilized on the second device, tip program 112 may provide a usage tip tailored to the second device. In doing so in the second embodiment, tip program 112 may reference an electronic user guide associated with the second device, or perform any of the steps mentioned above, in order to determine the steps needed to be performed in order to utilize the feature successfully on the second device. In other embodiments, there may be a central repository which stores usage data (features and corresponding usage steps) that is utilized by tip program 112 in determining whether a feature has been utilized correctly. In yet another embodiment, tip program 112 may transmit all usage tips stored in association with the login information of the user to the second device, after detection of the same application being utilized on the second device. In even further embodiments, tip program 112 may determine if the usage of the recorded features was successful on the second device (in the same manner as described above), and if the usage of the recorded feature was not successful, tip program 112 may provide a usage tip tailored to the second device.

Alternatively, with regard to the third embodiment, tip program 112 may be located on a central server. In this alternative, tip program 112 may detect a user utilizing a first device (computing device 110) by way of the user logging in. Tip program 112 may monitor usage of application 114 on computing device 110 (the first device), or the monitoring may be done locally by a sister program on computing device 110 (and then retrieved by tip program 112 via a network). Tip program 112 may store successful usage of features of application 114 (including the corresponding steps), or may utilize a reference guide or database which contains specific features of application 114 and the corresponding steps to utilize each specific feature correctly in association with the login information of the user. In addition, tip program 112 may store the most frequently utilized features and associated usage tips for the application, and/or the most frequently utilized features and associated usage tips specific to the user (determined via monitoring information) in association with login information of the user. Furthermore, tip program 112 may store features determined to be relevant to the user or to the feature via any process described above in association with the login information of the user.

Tip program 112 may then detect that the user of computing device 110 has begun using a second device. In this alternative, detection may be accomplished by receiving login information from the user. For example, each time the user logins into application 114, tip program 112 may receive the login information of the user (such as user ID and password) along with device ID information which is unique to the device being used by the user. Therefore, if the user logs into the same application from a second device, tip program 112 receives the login information of the user and the device ID associated with the second device, and is able to identify the user. The device information may also include information detailing the type of device, such as a CPU, a smartphone, a tablet, etc. Tip program 112 utilizes the device information to determine the type of device being used by the user and may transmit usage tips to the second device based on the usage tips stored in association with the login information of the user and/or features being utilized on the second device. For example, tip program 112 may monitor or receive monitoring information (from second device) and determine usage tips relevant to the features being utilized. Tip program 112 may also transmit all usage tips associated with the login information of the user and/or usage tips determined to be relevant to the user by any process described above. Tip program 112 may reference an electronic guide or feature database containing information detailing specific features and corresponding usage steps for multiple devices.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
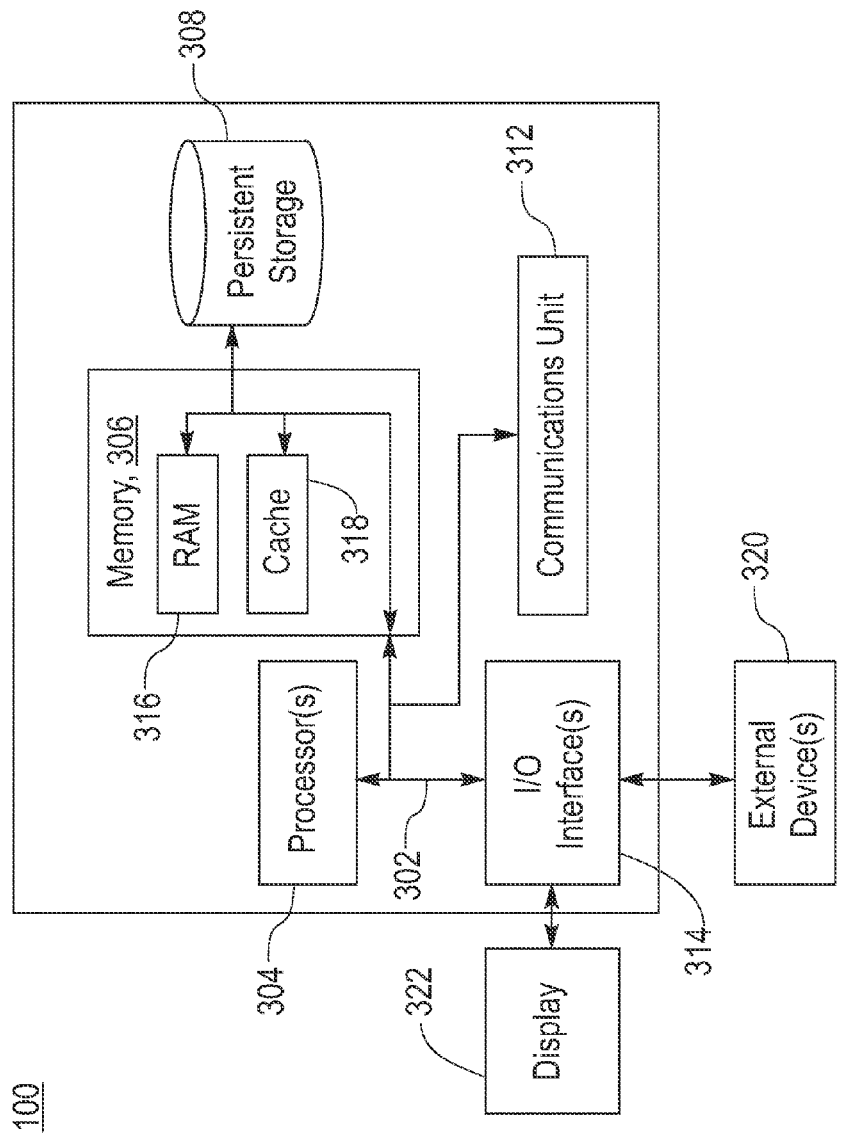
FIG. 3 is a block diagram depicting the hardware components of the usage tip creation system of FIG. 1, in accordance with an embodiment of the invention.

FIG. 3 depicts a block diagram of components of computing device 110 and social media server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and social media server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs tip program 112 and user interface 114 in computing device 110; and social media site 142 in social media server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs tip program 112 and user interface 114 in computing device 110, and social media site 142 in social media server 140, may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs tip program 112 and user interface 114 in computing device 110, and social media site 142 in social media server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a usage tip, comprising the steps of:
    monitoring, by one or more processors, usage of an application on a first computing device;
    determining, by one or more processors, whether the usage of a first feature of the application on the first computing device was successful;
    accessing, by one or more processors, a tag repository and obtaining all tags associated with the user;
    determining, by one or more processors, a user profession based on the accessed tags associated with the user;
    detecting, by one or more processors, that the user has begun using a second computing device, wherein the first computing device and the second computing device are different types of computing devices;
    detecting, by one or more processors, that the user is attempting to use the first feature of the application on the second computing device, wherein the operation of the application on the first computing device and the second computing device is different;
    creating, by one or more processors, a first usage tip based on the second computing devices type, wherein the first usage tip is associated with the first feature of the application that was successfully on the first computing device, so that, the first feature can be executed on the second computing device;
    creating, by one or more processors, a second usage tip for a second feature for the application to be carried out on the second computing device based on the accessed tags, such that, the second usage tip is related to the user profession; and
    displaying, by one or more processor, the first usage tip and the second usage tip on the second computing device.

2. The method of claim 1, wherein the step of determining, by one or more processors, whether the usage of the first feature of the application on the first computing device was successful further includes determining whether a number of times the first feature of the application has been utilized on the first computing device within a certain period of time, exceeds a threshold.

3. The method of claim 1, wherein the step of determining, by one or more processors, whether the usage of the first feature of the application on the first computing device was successful further includes prompting the user of the first computing device to provide input as to whether the usage of the feature was successful.

4. The method of claim 1, further comprising:
responsive to determining that the usage of the first feature of the application on the first computing device was successful, storing, by one or more processors, one or more steps associated with the usage of the first feature of the application on the first computing device;
determining, by one or more processors, whether the usage of the first feature of the application on the first computing device was successful at a later time; and
responsive to determining that the usage of the first feature of the application on the first computing device was unsuccessful at the later time, creating, by one or more processors, a usage tip associated with the first feature of the application based on the stored one or more steps associated with the usage of the first feature of the application on the first computing device.

5. The method of claim 1, wherein creating, by one or more processors, a usage tip associated with the first feature of the application on the second computing device further includes referencing, by one or more processors, a user guide or database containing usage steps regarding the feature of the application.

6. The method of claim 1, wherein the step of detecting, by one or more processors, that the user has begun using a second computing device further includes receiving, by one or more processors, login information of the user from the second computing device.

7. A computer program product for creating a usage tip, the computer program product comprising:
one or more computer-readable storage devices and program instructions stored on at least one of the one or more computer-readable storage devices, the program instructions comprising:
program instructions to monitor usage of an application on a first computing device;
program instructions to determine whether the usage of a first feature of the application on the first computing device was successful;
program instructions to determine that the usage of the first feature of the application on the first computing device was not successful;
program instructions to detect that the user has begun using a second computing device, wherein the first computing device and the second computing device are different types of computing devices;
program instructions to access a tag repository and obtaining all tags associated with the user;
program instructions to determine a user profession based on the accessed tags associated with the user;
program instructions to detect that the user is attempting to use the first feature of the application on the second computing device, wherein the operation of the application on the first computing device and the second computing device is different;
program instructions to create a first usage tip based on the second computing devices type, wherein the first usage tip is associated with the first feature of the application that was successfully on the first computing device, so that, the first feature can be executed on the second computing device;
program instructions to create a second usage tip for a second feature for the application to be carried out on the second computing device based on the accessed tags, such that, the second usage tip is related to the user profession; and
program instructions to display the first usage tip and the second usage tip on the second computing device.

8. The computer program product of claim 7, wherein the program instructions to determine whether the usage of the first feature of the application on the first computing device was successful further includes program instructions to determine whether a number of times the first feature of the application has been utilized on the first computing device within a certain period of time, exceeds a threshold.

9. The computer program product of claim 7, further comprising:
responsive to determining that the usage of the first feature of the application on the first computing device was successful, program instructions to store one or more steps associated with the usage of the first feature of the application on the first computing device;
program instructions to determine whether the usage of the first feature of the application on the first computing device was successful at a later time; and
responsive to determining that the usage of the first feature of the application on the first computing device was unsuccessful at the later time, program instructions to create the usage tip associated with the first feature of the application based on the stored one or more steps associated with the usage of the feature of the application on the first computing device.

10. The computer program product of claim 7, wherein the program instructions to create a first usage tip associated with the first feature of the application on the second computing device further includes program instructions to reference a user guide or database containing usage steps regarding the feature of the application.

11. The computer program product of claim 7, wherein the program instructions to detect that the user has begun using a second computing device further includes program instructions to receive login information of the user from the second computing device.

12. The computer program product of claim 7, wherein the program instructions to determine whether the usage of the first feature of the application on the first computing device was successful further includes program instructions to prompt a user of the first computing device to provide input as to whether the usage of the first feature was successful.

13. A computer system for creating a usage tip, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to monitor usage of an application on a first computing device;
program instructions to determine whether the usage of a first feature of the application on the first computing device was successful;
program instructions to determine that the usage of the first feature of the application on the first computing device was not successful;
program instructions to detect that the user has begun using a second computing device, wherein the first computing device and the second computing device are different types of computing devices;

program instructions to access a tag repository and obtain all tags associated with the user;

program instructions to determin a user profession based on the accessed tags associated with the user;

program instructions to detect that the user is attempting to use the first feature of the application on the second computing device, wherein the operation of the application on the first computing device and the second computing device is different;

program instructions to create a first usage tip based on the second computing devices type, wherein the first usage tip is associated with the first feature of the application that was successfully on the first computing device, so that, the first feature can be executed on the second computing device;

program instructions to create a second usage tip for a second feature for the application to be carried out on the second computing device based on the accessed tags, such that, the second usage tip is related to the user profession; and program instructions to display the first usage tip and the second usage tip on the second computing device.

14. The computer system of claim 13, wherein the program instructions to determine whether the usage of the first feature of the application on the first computing device was successful further includes program instructions to determine whether a number of times the first feature of the application has been utilized on the first computing device within a certain period of time, exceeds a threshold.

15. The computer system of claim 13, further comprising:
responsive to determining that the usage of the first feature of the application on the first computing device was successful, program instructions to store one or more steps associated with the usage of the first feature of the application on the first computing device;

program instructions to determine whether the usage of the first feature of the application on the first computing device was successful at a later time; and responsive to determining that the usage of the first feature of the application on the first computing device was unsuccessful at the later time, program instructions to create the first usage tip associated with the feature of the application based on the stored one or more steps associated with the usage of the first feature of the application on the first computing device.

16. The computer system of claim 13, wherein the program instructions to detect that the user has begun using a second computing device further includes program instructions to receive login information of the user from the second computing device.

17. The computer system of claim 13, wherein the program instructions to determine whether the usage of the first feature of the application on the first computing device was successful further includes program instructions to prompt a user of the first computing device to provide input as to whether the usage of the first feature was successful.

\* \* \* \* \*